United States Patent [19]

Dickopp et al.

[11] 4,005,476
[45] Jan. 25, 1977

[54] CIRCUIT FOR COMPENSATING TIME ERRORS IN A TELEVISION SIGNAL, PARTICULARLY FROM A RECORDING INSTRUMENT

[75] Inventors: Gerhard Dickopp, Berlin; Lothar Oertel, Ulm(Danube); Wolfgang Frey, Heilbronn, all of Germany

[73] Assignee: Licentia Patent-Verwaltungs-G.m.b.H., Frankfurt am Main, Germany

[22] Filed: Dec. 5, 1974

[21] Appl. No.: 530,145

[30] Foreign Application Priority Data

Dec. 11, 1973 Germany .......................... 2361562

[52] U.S. Cl. .................................. 360/36; 358/127
[51] Int. Cl.² .................... H04N 5/795; H04N 5/04
[58] Field of Search ... 178/6.6 R, 6.6 TC, 69.5 DC; 358/8; 360/36

[56] References Cited

UNITED STATES PATENTS

| | | | |
|---|---|---|---|
| 3,141,926 | 7/1964 | Newell | 178/6.6 TC |
| 3,580,991 | 5/1971 | Krause | 358/8 |
| 3,860,952 | 1/1975 | Tallent | 358/8 |
| 3,863,022 | 1/1975 | Bruch | 358/8 |
| 3,879,748 | 4/1975 | de Boer | 358/8 |
| 3,931,638 | 1/1976 | Lentz | 360/36 |

OTHER PUBLICATIONS

Automatic Connection of Timing Errors in Magnetic Tape Recorders, Hannan, et al., IEEE Transaction on Milt. Elec. July–Oct. 1965, pp. 246–254.

*Primary Examiner*—Raymond F. Cardillo, Jr.
*Attorney, Agent, or Firm*—Spencer & Kaye

[57] ABSTRACT

In a circuit for compensating time errors in a television signal and including an electronically controllable delay line in the path of the signal and control signal producing elements in a control signal path connected to the line to vary the delay from a basic value of $Y_0$ by $\pm \Delta Y$, the delay time of the control signal path is given a value which has a selected relation to $Y_0$.

4 Claims, 2 Drawing Figures

CICUIT FOR COMPENSATING TIME ERRORS IN A TELEVISION SIGNAL, PARTICULARLY FROM A RECORDING INSTRUMENT

BACKGROUND OF THE INVENTION

The present invention relates to the compensation of time errors in a television signal, particularly a recorded signal.

A television signal coming from a recording instrument, e.g. on a magnetic tape or video record, is known to be subject to time errors resulting from fluctuations in speed or changes in the shape of the record carrier. Often the magnitude of these speed fluctuations or shape changes varies cyclically, causing the time error to vary in magnitude cyclically, at some frequency.

It is known to compensate such time errors by including an electronically controllable delay line in the signal path, as disclosed, for example, in German Pat. No. 1,014,153. A phase comparison of the line sync pulses separated from the faulty signal with constant line sync pulses or a comparison of an additionally recorded pilot carrier with a constant pilot carrier (e.g. 600 kHz) produces a setting value which represents the time error and which changes the delay time in the delay line on the basis of a fixed basic delay time to compensate the time error. If, for example, the line scanning period of the signal is too short, the delay time is increased and the signal is expanded relative to the time axis to the correct value of the line scanning period.

For such a circuit it is also known, as disclosed in German Offenlegungsschrift No. 2,122,592, and U.S. Pat. No. 3,863,022 based on application Ser. No. 251,229 filed by Walter Bruch on May 8th, 1972, to employ, as the controllable delay line, an electronic memory, such as a bucket cascade device, which is timed by clock pulses, and to influence the frequency of the clock pulses by the setting value.

It has now been found that when the above-described time errors occurring in the signal vary cyclically in amplitude at certain frequencies such a circuit does not achieve sufficient time error compensation. It was noted that the signal became even poorer when the frequency of the time error variations increased. This drawback could not be overcome by increasing the amplification of the setting value since then the errors would be overcompensated at other time error variation frequencies.

SUMMARY OF THE INVENTION

It is an object of the present invention to further improve the known circuit for compensating time errors so that the circuit operates dependably over a wider time error frequency range.

These and other objects are achieved according to the present invention, in a circuit for compensating time errors in a television signal and including an electronically controllable delay line in the path of the signal, and control signal producing means for producing a control signal to vary the delay time of the delay line, by the provision of delay means connected to cause the delay time of the control signal path to be adapted to the basic delay time of the delay line.

The present invention is based on the following: the delay line disposed in the path of the useful signal has a certain basic delay time. This basic delay time of, for example, 20 $\mu s$ is necessary so that the setting value will be able to change the delay time in a positive as well as a negative direction. On the other hand, a delay is also present in the path of the setting value, i.e. the setting value appears at the control input of the delay line only a certain period after the occurrence of the error in the signal.

A significant improvement in the efficiency of the circuit can now be obtained if, according to the present invention, these two delays are adapted to one another, preferably so that the delay effective in the path of the setting value is approximately equal to one-half the basic delay time of the delay line in the path of the signal. In this case the setting value becomes effective at the control input of the delay line at the optimum point in time and a better time error compensation is realized.

If no significant time delay is present in the path of the setting value, an additional delay is added in this path. If the delay in the path of the setting value is already greater than the basic delay time of the delay line in the signal path, an additional delay is provided in the signal path, i.e. in series with the delay line.

DESCRIPTION OF THE PREFERRED EMBODIMENT

Figure 1:
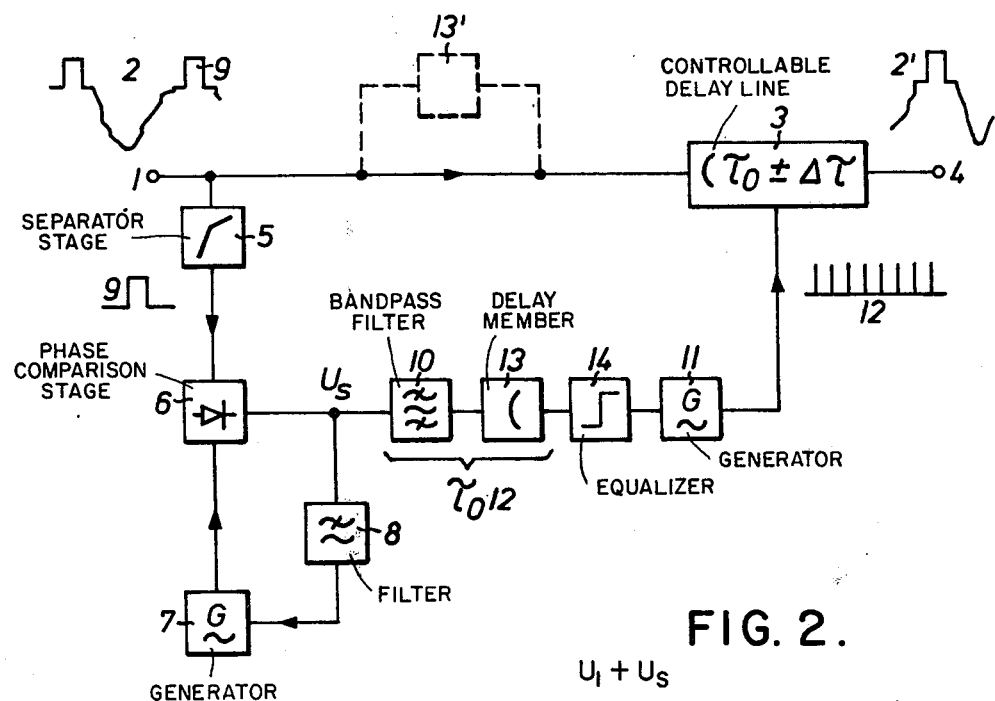
FIG. 1 is a circuit diagram of one preferred embodiment of the invention.

In the circuit shown in FIG. 1, a video signal 2 containing line sync pulses 9 and exhibiting time errors is present at terminal 1. Signal 2 passes through an electronically timed memory 3 which serves as the controllable delay line and which has a basic delay time $Y_0$ given by the frequency of the controlling clock pulses 12. The frequency of the clock pulses 12 is controlled in dependence on the time error so the delay time is changed by $\pm \Delta Y$ to produce a time error compensation. At a terminal 4 there then appears a video signal 2' which does not contain any time errors.

In a separator stage 5 the line sync pulses 9 are separated from the video signal 2 and fed to a phase comparison stage 6 in which the line sync pulses are compared with pulses from a generator 7. The resulting setting value $U_s$ is applied via a filter member 8 to adjust the output from generator 7 to the center frequency of the line sync pulses 9. The setting value $U_s$ at the output of stage 6, i.e. before filter member 8, follows the time fluctuations of the line sync pulses 9 and thus constitutes a representation of the time error in signal 2.

This setting value passes through a bandpass filter 10 to a generator 11, which produces the clock pulses 12 for memory 3. If, for example, the line scanning period for signal 2 is too short, the frequency of the clock pulses 12 is reduced. Then the signal 2 passes through memory 3 more slowly so that the line scanning period is expanded to the proper value. The circuit described thus far is known.

According to one embodiment of the present invention, a delay member 13 is included in the path of the setting value $U_s$. This delay member 13 produces a delay such that, together with the delay time of the filter 10 in the path of the setting value, it produces a delay of one-half the basic delay time of memory 3, i.e. $Y_0/2$. In this case it is assumed that no other delay is present in the path of the setting value, i.e. in the path constituted by elements 5, 6, 14, 11. The delay member 13 thus makes the delay period in the path of the setting value equal to $Y_0/2$.

This has the result of causing a change in the frequency of the clock pulses 12 resulting from a time error to become effective at the control input of the delay line at the proper point in time. The delay member 13 can also be placed somewhere else in the path of the setting value, e.g. before or after the separating stage 5.

The signal at the input of memory 3 is the original undelayed signal 2 whereas the signal at the output of memory 3 is delayed by $\tau_o$. By this reason it gives optimal results if the time correction occurs at a moment in the middle between no delay and delay of $\tau_o$, i.e. at a moment $\tau_o/2$ later than the original signal. This can also be shown by a methematical calculation.

If it is found that the delay time already present in the path of the setting value is greater than $Y_0/2$, an additional delay member 13' can be included in the path of the signal, in which case the direct connection between terminal 1 and delay member 3 would be interrupted.

A further improvement in the time error compensation is obtained when the amplitude of the setting value is influenced in dependence on the rate of change of the setting value, and thus also in dependence on the rate of variation of the time error, according to the factor $$\frac{\omega Y_o/2}{\sin(\omega Y_o/2)}$$

where $\omega$ represents the rate of change of the setting value in radians/sec. and thus also of the rate of variation of the time error, and $Y_O$ is the above-described basic delay time.

In FIG. 1 this frequency dependent amplitude distortion is effected by an equalizer 14. With an amplitude distortion according to the above formula it is theoretically possible to obtain an almost complete error compensation in the entire frequency range of interest of the time errors. For very small values of $\omega Y_o$ the individual solutions provided blend into one another. Circuits for frequency dependent amplitude distortion according to a special function as performed by equalizer 14 are described in the book "Reference data for Radio Engineers, fourth edition, International Telephone and Telegraph Corporation, 1956".

In order to produce a time error compensation, the frequency of the clock pulses 12 deviates from a basic frequency $f_o$ by a variable component $\Delta f$. The delay time produced by memory 3 is proportional to the period duration of the clock pulses 12. This delay period is supposed to change in correspondence with the time error.

In an advantageous manner, the circuit is thus dimensioned so that the variable component $\Delta(1/f)$ of the reciprocal of the frequency of clock pulse 12 is proportional to the time error. This can be accomplished by an additional amplitude distortion of setting value $U_s$ or generator 11 may be designed so that the magnitude of the variable portion of the reciprocal of the frequency of the clock pulses generated by generator 11 is directly proportional to the applied setting value. In this case it is assumed that the setting value itself is proportional to the time error.

A generator with said properties can be realized by a multivibrator with two transistors if the operating voltage for the collector-emitter paths of the transistors is varied linearly with the setting value. E.g. the sum of a constant operating voltage and of said setting value may be applied as dc-operating voltage to the collectors of both transistors.

Figure 2:
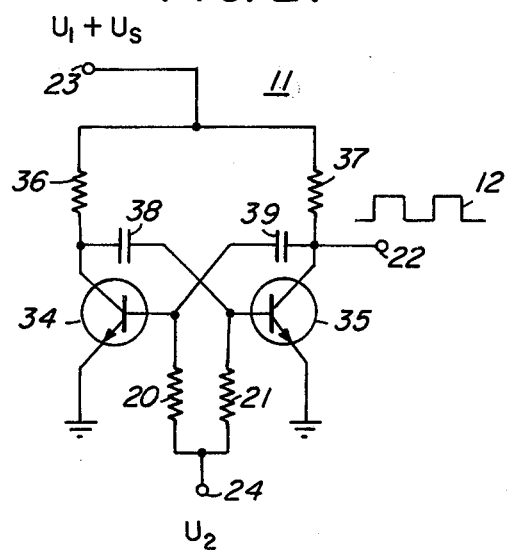
FIG. 2 is a circuit diagram of one embodiment of the generator 11 of FIG. 1.

FIG. 2 illustrates one embodiment of a generator 11 having an operating characteristic which produces the above-described relationship. The generator shown in FIG. 2 is essentially a multivibrator composed of two transistors 34 and 35, two collector resistors 36 and 37, two coupling capacitors 38 and 39, and base resistors 20 and 21. The generator produces the train of clock pulses 12 at its output terminal 22. In known circuits, the setting value $U_s$ would be applied via terminal 24 to the bases of transistors 34 and 35. This would establish a linear relationship between the frequency $f$ of the clock pulse sequence 12 and the setting value $U_s$, and thus also a linear relationship between the frequency $f$ and the time error.

However, in the circuit shown in FIG. 2, the setting value $U_s$ is not applied to terminal 24 but rather is applied to terminal 23, together with the operating voltage $U_1$. From terminal 23, the combined voltage is supplied to the collectors of transistors 34 and 35. Terminal 24 is connected to a source of a fixed bias voltage $U_2$. This bias voltage $U_2$ is given a value which is high with respect to the pulse amplitudes present at the bases of the transistors so that an almost constant current flows through resistors 20 and 21. This constant current, which is independent of the pulse voltages and which effects recharging of the capacitors 38 and 39, produces a time proportional recharging of capacitors 38 and 39, and thus establishes a linear relationship between $1/f$ and $U_s$. It has been found that in this circuit, in which the setting value controls the collector voltage of transistors 34 and 35, there exists a linear relationship between the reciprocal $1/f$ of the frequency $f$ of the train of clock pulses 12 and the setting value $U_s$, and thus the time error.

It will be understood that the above description of the present invention is susceptible to various modifications, changes and adaptations, and the same are intended to be comprehended within the meaning and range of equivalents of the appended claims.

We claim:
1. In a circuit for compensating time errors in a television signal, including means defining a first conducting path connected to conduct the television signal, means defining a second conducting path, a delay line presenting electronically controllable delay time connected in the first conducting path, and signal generating means connected in the second conducting path for producing a control signal to vary the delay time of the delay line from a basic delay time value $Y_O$ by an amount $\pm \Delta Y$, the improvement comprising delay means connected in at least one of said conducting paths, said delay means producing a signal time delay which causes the delay time effective in said second path to be one-half the basic delay time $Y_O$, thereby to provide a more accurate compensation with respect to time errors which vary at higher rates.

2. A circuit as defined in claim 1 wherein the television signal is a recorded signal.

3. A circuit as defined in claim 1 further comprising means disposed in the path of said signal generating means for distorting the amplitude of the control signal in dependence on its rate of change.

4. A circuit as defined in claim 3 wherein the amplitude distortion is effected according to the factor $$\frac{\omega Y_0/2}{\sin(\omega Y_0/2)}$$

where $\omega$ is the rate of change of the setting value in radians/sec.

* * * * *